(12) United States Patent
Collet et al.

(10) Patent No.: US 9,798,943 B2
(45) Date of Patent: Oct. 24, 2017

(54) OPTICAL CHARACTER RECOGNITION METHOD

(71) Applicants: Frederic Collet, Etterbeek (BE); Jordi Hautot, Neupre (BE); Michel Dauw, Machelen (BE); Pierre De Muelenaere, Court-Saint-Etienne (BE); Olivier Dupont, Sombreffe (BE); Gunter Hensges, Wurselen (DE)

(72) Inventors: Frederic Collet, Etterbeek (BE); Jordi Hautot, Neupre (BE); Michel Dauw, Machelen (BE); Pierre De Muelenaere, Court-Saint-Etienne (BE); Olivier Dupont, Sombreffe (BE); Gunter Hensges, Wurselen (DE)

(73) Assignee: I.R.I.S., Mont-Saint-Guibert (BE)

( * ) Notice: Subject to any disclaimer, the term of this patent is extended or adjusted under 35 U.S.C. 154(b) by 483 days.

(21) Appl. No.: 14/299,205

(22) Filed: Jun. 9, 2014

(65) Prior Publication Data

US 2015/0356365 A1 Dec. 10, 2015

(51) Int. Cl.
*G06K 9/18* (2006.01)
*G06K 9/34* (2006.01)
*G06K 9/68* (2006.01)

(52) U.S. Cl.
CPC ............. *G06K 9/18* (2013.01); *G06K 9/344* (2013.01); *G06K 9/6842* (2013.01);
(Continued)

(58) Field of Classification Search
USPC .......... 1/1; 345/467; 370/229; 382/177, 185, 382/227, 229; 600/509; 704/251, 277;
(Continued)

(56) References Cited

U.S. PATENT DOCUMENTS 5,060,277 A * 10/1991 Bokser ................. G06K 9/6218
382/160
5,872,730 A * 2/1999 Shevach ................... G06K 9/03
708/530
(Continued)

OTHER PUBLICATIONS

Hong Guo, Xiaoqing Ding, Zhong Zhang, Fanxia Guo, Youshou Wu, "Realization of a High-Performance Bilingual Chinese-English OCR system," icdar, vol. 2, pp. 978-981, Proceeding of Third International Conference on Document Analysis and Recognition (ICDAR'95)—Sep. 1995.
(Continued)

*Primary Examiner* — Xuemei Chen
(74) *Attorney, Agent, or Firm* — Jerold I. Schneider; Schneider Rothman Intellectual Property Law Group, PLLC

(57) ABSTRACT

The optical character recognition method applies a first OCR engine to provide an identification of characters of at least a first type of characters and zones of at least a second type of characters in the character string image. A second OCR engine is applied on the zones of the at least second type of characters to provide an identification of characters of a second type of characters. The characters identified by the first OCR engine and by the second OCR engine are in a further step combined to obtain the identification of the characters of the character string image.

20 Claims, 4 Drawing Sheets

(52) U.S. Cl.
CPC .... *G06K 2209/01* (2013.01); *G06K 2209/011* (2013.01); *G06K 2209/013* (2013.01)

(58) Field of Classification Search
USPC .......................................................... 708/530
See application file for complete search history.

(56) References Cited

U.S. PATENT DOCUMENTS

| | | | | |
|---|---|---|---|---|
| 6,047,251 | A * | 4/2000 | Pon | G06K 9/6807 382/229 |
| 7,289,123 | B2 * | 10/2007 | Duggan | G06T 11/203 345/467 |
| 7,649,838 | B2 * | 1/2010 | Fishteyn | G06Q 30/0247 370/229 |
| 7,742,806 | B2 * | 6/2010 | Sternickel | A61B 5/04007 600/509 |
| 7,805,004 | B2 * | 9/2010 | Han | G06K 9/468 382/185 |
| 8,385,652 | B2 * | 2/2013 | Mitic | G06K 9/342 382/177 |
| 8,463,054 | B2 * | 6/2013 | De Muelenaere | G06K 9/44 382/227 |
| 9,141,607 | B1 * | 9/2015 | Lee | G06F 17/289 |
| 9,183,636 | B1 * | 11/2015 | Collet | G06T 7/0079 |
| 9,390,340 | B2 * | 7/2016 | Lin | G06K 9/18 |
| 2004/0006467 | A1 * | 1/2004 | Anisimovich | G06K 9/6842 704/251 |
| 2004/0117192 | A1 * | 6/2004 | Miletzki | B07C 3/14 704/277 |

OTHER PUBLICATIONS

Zhi-Dan Feng, Qiang Huo, "Confidence Guided Progressive Search and Fast Match Techniques for High Performance Chinese/English OCR," icpr, vol. 3, pp. 30089-30092, Proceeding of 16th International Conference on Pattern Recognition (ICPR'02)—Jan. 2002, IEEE Computer Society.

Qiang Huo, Zhi-Dan Feng, "Improving Chinese/English OCR Performance by Using MCE-based character-Pair Modeling and Negative Training," ICDAR, vol. 1, pp. 364-368, Proceeding of Seventh International Conference on Document Analysis and Recognition (ICDAR'03) Jan. 2003.

Zhengang Chen, Xiaoqing Ding, "Rejection Algorithm for Missegmented Characters in Multilingual Document Recognition," icdar, vol. 2, pp. 746-750, Proceeding of Seventh International Conference on Document Analysis and Recognition (ICDAR'03)—Jan. 2003, IEEE Computer Society.

Y. Xia, B. H. Ziao, C. H. Wang, R.W. Dai, "Integrated Segmentation and Recognition of Mixed Chinese/English Document," ICDAR, vol. 2, pp. 704-708, Ninth International Conference on Document Analysis and Recognition (ICDAR 2007) vol. 2, 2007.

Kai Wang, Jianming Jin, Qingren Wang, "High Performance Chinese/English Mixed OCR with Character Level Language Identification," 2009 10th International Conference on Document Analysis and Recognition, IEEE Computer Society pp. 406-410.

* cited by examiner

OPTICAL CHARACTER RECOGNITION METHOD

FIELD OF THE INVENTION

The invention relates to an optical character recognition method. More specifically, the invention relates to an optical character recognition method for recognizing more than one type of characters.

BACKGROUND OF THE INVENTION

Optical Character Recognition (OCR) methods convert the image of text into machine-readable code by using a character recognition method to identify the characters represented on the image.

Known optical character recognition methods start with an image including a string of characters, and, with an OCR engine, provide an ID of the characters present in the string of characters, i.e., an identification of the characters in machine-readable code to obtain a searchable string of characters.

Many OCR engines exist. They have to work fast, with limited computing resources and accurately recognize characters. Speed, limited resources and accuracy are contradictory requirements and in practice, a good OCR engine is based on trade-offs between these characteristics.

An OCR engine designed for the recognition of Latin characters (e.g. English) is different than an OCR engine designed for the recognition of Asian characters (Chinese, Japanese and Korean) or Arabic characters. For instance, the database of identification is different even if some characters like punctuation signs and numerical digits may be present in several databases. The database of Latin characters may contain less than 100 characters, while the database of Asian characters may contain about 5000 characters per language. Therefore, an OCR engine designed for Asian characters typically requires more memory than an OCR engine designed for Latin characters. Algorithms that have to take into account the diversity of characters are optimized differently due to this large discrepancy in the number of characters. The features used for character recognition are different because the shapes of Latin characters are simpler than the shapes of Asian characters that can contain many strokes, but the shapes of Latin characters have more variations due to a high number of Latin fonts. Furthermore, contextual decision algorithms that make the final decision about the character identification by using linguistic and typographic models are different. Linguistic models for Latin languages use especially a language dictionary with probabilities of occurrence of words, while Linguistic models for Asian languages use especially a character n-grams with probabilities of occurrence. (A character n-gram is a sequence of n consecutive characters). Another reason why OCR engines are different for Latin and Asian characters is that there are no spaces between words in Chinese or Japanese texts.

Altogether, using a known OCR engine for multiple types of characters like Latin and Asian does not provide the desired outcome being accurate, fast and requiring low computing resources. That's why known OCR engines are typically designed for only one type of characters, and if a known OCR engine includes the possibility of recognizing characters of another type of characters, its accuracy for recognizing that other type of characters is typically low. This lack of accuracy is especially an issue because many documents today are containing a mix of different types of characters, such as for example a Japanese invoice or purchase order that contains Japanese text but also English names, English postal addresses, email addresses, amounts in numbers, . . . .

SUMMARY OF THE INVENTION

It is an aim of this invention to provide a character identification method for fast and accurate identification of the characters in a character string image.

It is another aim of this invention to provide a computer program product for carrying out said character identification method.

These aims are achieved according to the invention as described in the independent claims.

In a first aspect, the present invention provides a method for identifying characters in a character string image, the method comprising:

(i) applying a first OCR engine to provide an identification of characters of at least a first type of characters and zones of at least a second type of characters in the character string image, (ii) applying on the zones of the at least second type of characters a second OCR engine to provide an identification of characters of a second type of characters, and (iii) combining the characters identified by the first OCR engine and by the second OCR engine to obtain the identification of the characters of the character string image, wherein the first OCR engine comprises a segmentation of the character string image into segmentation parts, and comprises, for each segmentation part the steps of (a) applying a first character classification to provide a first plurality of hypotheses on an at least one character represented by the segmentation part and a first plurality of probabilities associated with the hypotheses of the first plurality of hypotheses, (b) verifying if the first plurality of hypotheses satisfies at least one condition, (c) if at least one condition is satisfied, applying a second character classification to provide a second plurality of hypotheses on the at least one character represented by the segmentation part and a second plurality of probabilities associated with the hypotheses of the second plurality of hypotheses.

In such method, the characters of the first type are directly analyzed by the first character classification in the first OCR engine, their treatment is fast and accurate. Only characters where a doubt exists after the first character classification in the first OCR engine are analyzed by a second character classification in the first OCR engine, the doubt being assessed by the verification at step b). This selection of characters to be analyzed by the second character classification makes the method especially fast. A second OCR engine is then used only on zones where another type of characters than the first type of characters was detected, to increase the accuracy of identification of the characters of the second type of characters. The fact that the second OCR engine is used only on zones where another type of characters than the first type of characters was detected makes that the second OCR engine is used only when needed. For example, the second OCR engine is not used at all in a text with only characters of the first type, but if a text also contains characters of the second type of characters at few places like an email address in a Chinese invoice, the accuracy on their identification is high.

Altogether, the characters of the second type of character are analyzed twice during this process, at two different levels (character classification and full OCR engine), which gives an excellent accuracy.

In an embodiment according to the invention, the first OCR engine uses a database of characters including characters of the first type of characters. The first OCR engine identifies characters of the first type of characters, which is based on recognition of the shapes of the characters by comparison with models of characters present in a database.

In an embodiment according to the invention, the first character classification uses a database of characters including characters of the first type of characters. The purpose of the first character classification is to classify the characters of the first type as early as possible in the identification method because the less steps these characters undergo, the faster the identification method.

In an embodiment according to the invention, the first character classification is able to detect characters of at least another type of characters than the first type of characters. It is especially interesting because a detection of another type of character in a segmentation part is a strong indicator that a second character classification, designed for another type of characters, will increase the accuracy of the identification method.

In an embodiment according to the invention, the first type of characters is an Asian type of characters.

In an embodiment according to the invention, the second OCR engine uses a database of characters including characters of the second type of characters. The second OCR engine identifies characters of the second type of characters, which is based on recognition of the shapes of the characters by comparison with models of characters present in a database.

In an embodiment according to the invention, the second character classification uses a database of characters including characters of the second type of characters. The purpose of the second character classification is to classify the characters of the second type, which provides hypotheses on their identification associated with probabilities. It makes possible to choose, in a next step of the first OCR engine using contextual decision, identification of the first or the second type.

In an embodiment according to the invention, the second type of characters is a Latin type of characters.

In an embodiment according to the invention, the first type of characters is the Latin type of characters, the Arabic type of characters, the Hebrew type of characters, the Cyrillic type of characters, the Greek type of character or the hieroglyph type of characters. The method can be applied to any type of characters, including those mentioned here.

In an embodiment according to the invention, the second type of characters is the Asian type of characters, the Arabic type of characters, the Hebrew type of characters, the Cyrillic type of characters, the Greek type of character or the hieroglyph type of characters. The method can be applied to any type of characters, including those mentioned here.

In an embodiment according to the invention, at least one of the first character classification and second character classification is a single character classification.

In an embodiment according to the invention, the zones of the at least second type of characters are groups of segmentation parts wherein some segmentation parts satisfy at least one of the following conditions:

all probabilities of the hypotheses provided by the first character classification for said segmentation part are below a given threshold;

an hypothesis amongst the hypotheses for said segmentation part relates to a character of the first type of characters known to look like a character of the at least second type of characters;

an hypothesis amongst the hypotheses for said segmentation part relates to another type of characters than the first type of characters; and a character of the second type of characters was identified on said segmentation part by the first OCR engine.

For the identification to be fast, it is important that the second OCR engine is applied only on text zones where characters other than the first type of characters are probably present. If a zone fulfils at least one of the criteria given here, the chance is high that characters other than the first type of characters are present.

In an embodiment according to the invention, the at least one condition is one of the following conditions:

all probabilities of the hypotheses of the first character classification are below a given threshold;

an hypothesis amongst the hypotheses of the first character classification relates to a character of the first type of characters known to look like a character of another type of characters; and an hypothesis amongst the hypotheses of the first character classification relates to another type of characters than the first type of characters.

For the identification to be fast, it is important that the second character classification is applied only on segmentation parts where characters other than the first type of characters are probably present. If a segmentation part fulfils at least one of the criteria given here, the chance is high that characters other than the first type of characters are present.

In an embodiment according to the invention, the segmentation of the character string image into segmentation parts comprises the steps of:

determining a first starting point coordinate of a pixel contrasting to a background, generating a list of potential character widths dependent on a maximum character width and on characteristics of the portion of the character string image corresponding to the maximum character width, and determining a second portion of the character string image corresponding to the first starting point coordinate and the first width on the list of potential character widths.

A segmentation method based on the width of the characters like this is especially efficient for Asian texts where characters are not grouped in words.

In an embodiment according to the invention, the first plurality of probabilities corresponds to a first scale of probability, the second plurality of probabilities corresponds to a second scale of probability, and the method comprises a step of transforming at least one of the first plurality of probabilities and second plurality of probabilities to scale the first or the second scales of probability in such a way that the first plurality of probabilities and the second plurality of probabilities can be compared, to obtain transformed first or second pluralities of probabilities.

A problem can occur when the probabilities provided by the two classifications are not in the same scale. A step of transforming one of the probabilities is thus needed in order to be able to consider them on the same way in a further step of contextual decision.

In an embodiment according to the invention, the first OCR engine further comprises a step of making a contextual decision for the identification of characters of the at least first type of characters based on the hypotheses from the first character classification with their corresponding probabilities and the hypotheses from the second character classification with their corresponding probabilities for all segmentation parts.

A lot of hypotheses may be generated by the character classification of all segmentation parts of the image of the string of characters. The contextual decision determines, based on the character ID hypotheses probabilities generated by the first character classification and the second character classification if the second character classification was used, and based on the context of the characters, the identification of the characters which is the output of the first OCR engine.

In an embodiment according to the invention, the step of making a contextual decision uses at least one of the decision support tools amongst decision graph, linguistic model and typographical model. A contextual decision using one or several of these decision support tools has been found to be especially fast and accurate in OCR. For example, searching for the shortest path in a decision graph makes possible to take into account, in the decision of identification of the characters of the image altogether, the probabilities generated by the character classifications and the probabilities generated by the application of linguistic models, typographical models.

In a second aspect, the present invention provides a computer program product comprising a computer usable medium having control logic stored therein for causing a computing device to identify characters in a character string image, the control logic comprising:
(i) first computer readable program code means for applying a first OCR engine to provide an identification of characters of at least a first type of characters and zones of at least a second type of characters in the character string image,
(ii) second computer readable program code means for applying on the zones of at least a second type of characters a second OCR engine to provide an identification of characters of a second type of characters, and
(iii) third computer readable program code means for combining the characters identified by the first OCR engine and by the second OCR engine to obtain the identification of the characters of the character string image, wherein the first OCR engine comprises a segmentation of the character string image into segmentation parts, and comprises, for each segmentation part the steps of
(a) applying a first character classification to provide a first plurality of hypotheses on an at least one character represented by the segmentation part and a first plurality of probabilities associated with the hypotheses,
(b) verifying if the first plurality of hypotheses satisfies at least one condition, and
(c) if at least one condition is satisfied, applying a second character classification to provide a second plurality of hypotheses on the at least one character represented by the segmentation part and a second plurality of probabilities associated with the hypotheses.

Such computer product makes possible to apply the invention in a very efficient way in order to provide an identification in a machine-readable code of the characters represented by the image of string of characters.

In a third aspect, the present invention provides a method for identifying characters in a character string image, the method comprising:
(i) applying an OCR engine designed for Asian characters to provide an identification of Asian characters and zones of non-Asian characters in the character string image,
(ii) applying on the zones of non-Asian characters an OCR engine designed for Latin characters to provide an identification of Latin characters, and
(iii) combining the characters identified by the OCR engine designed for Asian characters and the OCR engine designed for Latin characters to obtain the identification of the Asian and Latin characters of the character string image,
wherein the OCR engine designed for Asian characters comprises the steps of:
(A) segmenting the character string image into segmentation parts,
(B) for each segmentation part, applying a single character classification designed for Asian characters to provide a first plurality of hypotheses on an at least one character represented by the segmentation part and a first plurality of probabilities associated with the hypotheses, and
(C) making a contextual decision for the identification of the at least Asian characters based on the hypotheses from the single character classification designed for Asian characters and their corresponding probabilities for all segmentation parts.

Latin characters are analyzed at the single-character classification level in this embodiment of the invention. Since only segmentation parts where a doubt appear during the single character classification designed for Asian characters are analyzed with the single-character classification designed for Latin characters, the full method is fast.

In an embodiment of the present invention, step (B) further comprises, for each segmentation part the substeps of:
verifying if the first plurality of hypotheses satisfies at least one condition, and
if at least one condition is satisfied, applying a single character classification designed for Latin characters to provide a second plurality of hypotheses on the at least one character represented by the segmentation part and a second plurality of probabilities associated with the hypotheses,
and wherein the contextual decision of step (C) is a contextual decision for the identification of characters based on the hypotheses from the single character classification designed for Asian characters and their corresponding probabilities and the hypotheses from the single character classification designed for Latin characters and their corresponding probabilities for all segmentation parts.

Latin characters are analyzed twice during the application of this embodiment of the invention, at two different levels (single-character classification and full OCR engine), which gives an excellent accuracy. Since only segmentation parts where a doubt appear during the single character classification designed for Asian characters are analyzed with the single-character classification designed for Latin characters and possibly with the full OCR engine designed for Latin characters, the full method is fast.

According to a fourth aspect, the invention provides a computer program product comprising a computer usable medium having control logic stored therein for causing a computing device to identify characters in a character string image, the control logic comprising:
(i) first computer readable program code means for applying an OCR engine designed for Asian characters to provide an identification of Asian characters and zones of non-Asian characters in the character string image,
(ii) second computer readable program code means for applying on the zones of non-Asian characters an OCR engine designed for Latin characters to provide an identification of Latin characters, and
(iii) third computer readable program code means combining the characters identified by the OCR engine designed for Asian characters and the OCR engine designed for Latin characters to obtain the identification of the Asian and Latin characters of the character string image, wherein the OCR engine designed for Asian characters comprises the steps of:

(A) segmenting the character string image into segmentation parts, (B) for each segmentation part, applying a single character classification designed for Asian characters to provide a first plurality of hypotheses on an at least one character represented by the segmentation part and a first plurality of probabilities associated with the hypotheses, and (C) making a contextual decision for the identification of the at least Asian characters based on the hypotheses from the single character classification designed for Asian characters and their corresponding probabilities for all segmentation parts.

Such computer product makes possible to apply the invention in a very efficient way in order to provide an identification in a machine-readable code of the characters represented by the image of string of characters.

According to a fifth aspect, the invention provides a method for identifying characters in a character string image, the method comprising the steps of:

(A) segmenting of the character string image into segmentation parts, (B) for each segmentation part, the substeps of:
  (a) applying a first character classification to provide a first plurality of hypotheses on an at least one character represented by the segmentation part and a first plurality of probabilities associated with the hypotheses,
  (b) verifying if the first plurality of hypotheses satisfies at least one condition,
  (c) if at least one condition is satisfied, applying a second character classification to provide a second plurality of hypotheses on the at least one character represented by the segmentation part and a second plurality of probabilities associated with the hypotheses, and (C) making a contextual decision for the identification of the characters of the at least first type of characters based on the hypotheses from the first character classification with their corresponding probabilities and the hypotheses from the second character classification with their probabilities for all segmentation parts.

In such method, the characters of a first type are directly analyzed by the first character classification, their treatment is fast and accurate. Only characters where a doubt exists after the first character classification are analyzed by a second character classification, the doubt being assessed by the verification. This selection of characters to be analyzed by the second character classification makes the method especially fast.

According to a sixth aspect, the invention provides a computer program product comprising a computer usable medium having control logic stored therein for causing a computing device to identify characters in a character string image, the control logic comprising computer readable program code means for segmenting the character string image into segmentation parts, and comprising, for each segmentation part:

(A) first computer readable program code means for segmenting of the character string image into segmentation parts, (B) second computer readable program code means for applying, for each segmentation part, the substeps of:
  (a) a first character classification to provide a first plurality of hypotheses on an at least one character represented by the segmentation part and a first plurality of probabilities associated with the hypotheses,
  (b) a verification if the first plurality of hypotheses satisfies at least one condition,
  (c) if at least one condition is satisfied, a second character classification to provide a second plurality of hypotheses on the at least one character represented by the segmentation part and a second plurality of probabilities associated with the hypotheses, and (C) third computer readable program code means for making a contextual decision for the identification of the characters of the at least first type of characters based on the hypotheses from the first character classification with their corresponding probabilities and the hypotheses from the second character classification with their probabilities for all segmentation parts.

Such computer product makes possible to apply the invention in a very efficient way in order to provide an identification in a machine-readable code of the characters represented by the image of string of characters.

According to a seventh aspect, the invention provides a method for identifying characters in a character string image, the method comprising:

(i) applying a first OCR engine to provide an identification of characters of at least a first type of characters and zones of at least a second type of characters in the character string image, (ii) applying on the zones of the at least second type of characters a second OCR engine to provide an identification of characters of a second type of characters, and (iii) combining the characters identified by the first OCR engine and by the second OCR engine to obtain the identification of the characters of the character string image.

In such method, the characters of the first type are directly analyzed by the first OCR engine, their treatment is fast and accurate. A second OCR engine is used only on zones where another type of characters than the first type of characters was detected, to increase the accuracy of identification of the characters of the second type of characters. The fact that the second OCR engine is used only on zones where another type of characters than the first type of characters was detected makes that the second OCR engine is used only when needed. For example, the second OCR engine is not used at all in a text with only characters of the first type, but if a text also contains the second type of characters, the accuracy on their identification is high.

In an embodiment according to the invention, the first OCR engine comprises at least one the following:

(a) use of a database of characters including characters of the first type of characters;

(b) segmentation designed for the first type of character;

(c) character classification designed for the first type of character; and (d) contextual decision designed for the first type of character.

In an embodiment according to the invention, the second OCR engine comprises at least one the following:

(a) use of a database of characters including characters of the second type of characters;

(b) segmentation designed for the second type of characters;

(c) character classification designed for the second type of characters; and (d) contextual decision designed for the second type of characters.

Several parts of an OCR engine can be especially designed for a given type of characters. For example, a segmentation using atoms, where segmentation parts comprise between one and five atoms can be especially appropriate for Asian characters, while a segmentation based on detection of inter-character breaks can be especially appropriate for Latin characters. Character classifications used for Latin and Asian characters can be different because they calculate features in a different way. The contextual decision are also different. Latin linguistic models use especially a language dictionary, while Asian linguistic models uses especially character n-grams. Altogether, many ways exist to tailor-make an OCR for a given type of characters.

According to an eighth aspect, the invention provides a computer program product comprising a computer usable medium having control logic stored therein for causing a computing device to identify characters in a character string image, the control logic comprising:

(i) first computer readable program code means for applying a first OCR engine to provide an identification of characters of at least a first type of characters and zones of at least a second type of characters in the character string image, (ii) second computer readable program code means for applying on the zones of at least a second type of characters a second OCR engine to provide an identification of characters of a second type of characters, and (iii) third computer readable program code means for combining the characters identified by the first OCR engine and by the second OCR engine to obtain the identification of the characters of the character string image.

Such computer product makes possible to apply the invention in a very efficient way in order to provide an identification in a machine-readable code of the characters represented by the image of string of characters.

BRIEF DESCRIPTION OF THE DRAWINGS

For a better understanding of the present invention, reference will now be made, by way of example, to the accompanying drawings in which.

DESCRIPTION OF THE INVENTION

Figure 1:
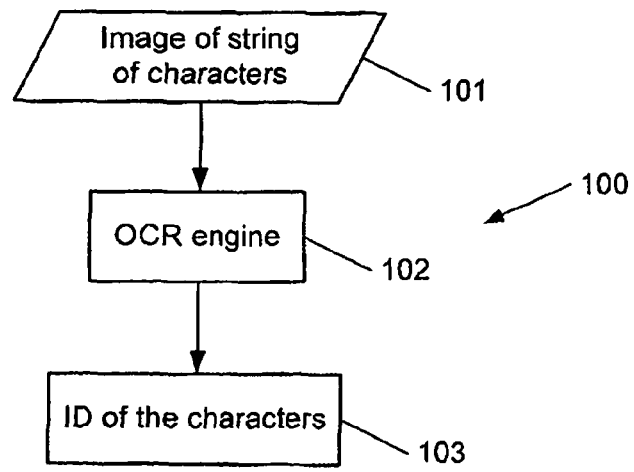
FIG. 1 shows a flowchart of an OCR method according to the state of the art.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

The term character, as used herein refers to a symbol or sign used in writing like a grapheme, a logogram, an alphabetic letter, a typographical ligature, a numerical digit or a punctuation sign.

The terms "designed for", speaking about for example an OCR engine or a classification designed for a type of character, refer to the fact the OCR engine or classification has been optimized in order to be especially fast and accurate in the identification or classification of that type of character, which can be for example the Asian type of character, Latin type of character, Arabic type of character, . . . . An OCR engine or a classification designed for a type of characters uses a database including models of characters of that type of characters. All types of characters may include punctuation signs, numerical digits and symbols. An OCR engine or classification designed for a given kind of character may be able to identify or classify other kinds of characters, but, typically, an OCR engine designed for Asian character accurate in recognizing Latin characters than an OCR engine designed for Latin characters.

The terms identification and ID as used herein refer to a recognition of one or several characters in machine-readable code to obtain a searchable string of characters. The identification or ID is an output of an OCR engine.

The term classification as used herein refers to the generation of a plurality of hypotheses on the identification of one or several characters. Each identification hypothesis, or ID hypothesis, is associated with a probability that the identification hypothesis is correct, i.e., that the image or segmentation part that undergoes the classification indeed represents the character or group of characters of the identification hypothesis. Classification can be performed by a dedicated program called a classifier. A classification designed to classify characters one by one or ligatures is called single-character classification. The term "to classify" as used herein means "to realize a classification". Even when the invention is described with embodiments comprising single-character classification, it should be understood that the scope of the present invention extends to other kinds of classification, including classification other than single-character.

The terms hypotheses, ID hypotheses and identification hypotheses as used herein refer to alternative solutions for the identification of a character or group of characters. One or several hypotheses are the output of the classification and a decision has still to be made on determining the output of the OCR engine. An hypothesis corresponds to a predefined model of a character or a group of characters. The hypotheses can also be called alternatives or candidates.

The terms atom and blob as used herein refer to the biggest part of an image that is made of touching pixels of a given color. For example, in a black and white image, an atom or blob is an ensemble of black pixels connected together by black pixels.

The term contextual decision as used herein refers to decision based on the context of a character to decide on the identification of said character. For example, a whole word can be considered to decide on the identification of every letter of the word.

FIG. 1 shows a flowchart of an OCR method 100 according to the state of the art. An image 101 of a string of characters is taken as input by an OCR engine 102. The OCR engine 102 processes the information contained in the image and provides an ID 103 of the characters of the string of characters of the image 101 as an output.

Figure 2:
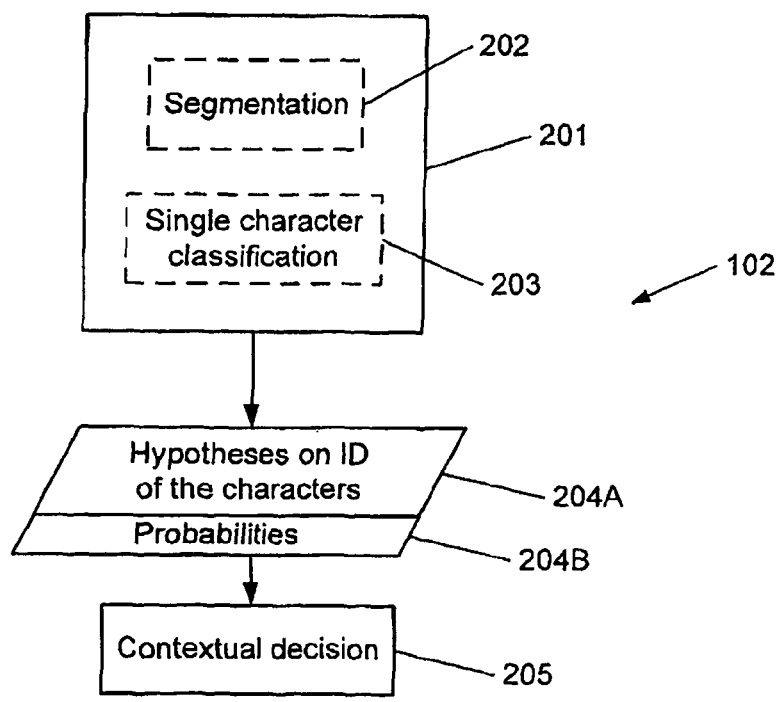
FIG. 2 shows a flowchart of an OCR engine according to the state of the art.

FIG. 2 shows a flowchart of an OCR engine 102 according to the state of the art. The OCR engine 102 includes a step 201 that combines segmentation 202 and single character classification 203.

The segmentation 202 is a division of the image of the string of characters 101 into segmentation parts that possibly correspond to characters. A segmentation part is a part of the image of the string of characters 101 that undergoes processes to determine if it represents a character, a group of characters, a pattern, . . . . Typically, many alternative divisions of the image of the string of characters are considered during the step 201 combining segmentation 202 and single character classification 203. If the image of the string of characters 101 is an image of a line of characters, a segmentation part is a part of that line of characters. Since a segmentation part is a part of an image, a segmentation part is itself an image.

The single character classification 203 generates, for a segmentation part, one or several ID hypotheses with their associated probabilities. Typically, the single character classification 203 calculates, amongst a series of models of characters, which models have the highest probabilities to correspond to the character represented on the segmentation part.

The single character classification 203 generates, in association with each ID hypothesis for a given segmentation part, a probability that this ID hypothesis is correct, i.e., a probability that the segmentation part actually represents this character. The probability can be for example a percentage or a likelihood weight.

A character classification more general than "single-character classification" can be used in the OCR engine 102. It can identify group of characters (e.g. ligatures), patterns, logos, designs . . . .

The combination step 201 uses alternatively segmentation 202 and single character classification 203 to generate a series of hypotheses 204A on the ID of the characters of the image of the string of characters 101 and associated probabilities 204B.

The series of hypotheses 204A on the ID of the characters of the image of the string of characters 101, associated with their probabilities 204B, is then analyzed during a step of contextual decision 205 that determines, amongst the hypotheses on ID of the characters 204A, the hypothesis with the highest global probability for the full image of the string of characters 101. The hypothesis with the highest global probability is identified as the ID of the characters 103 and is the output of the OCR engine 102.

Figure 3:
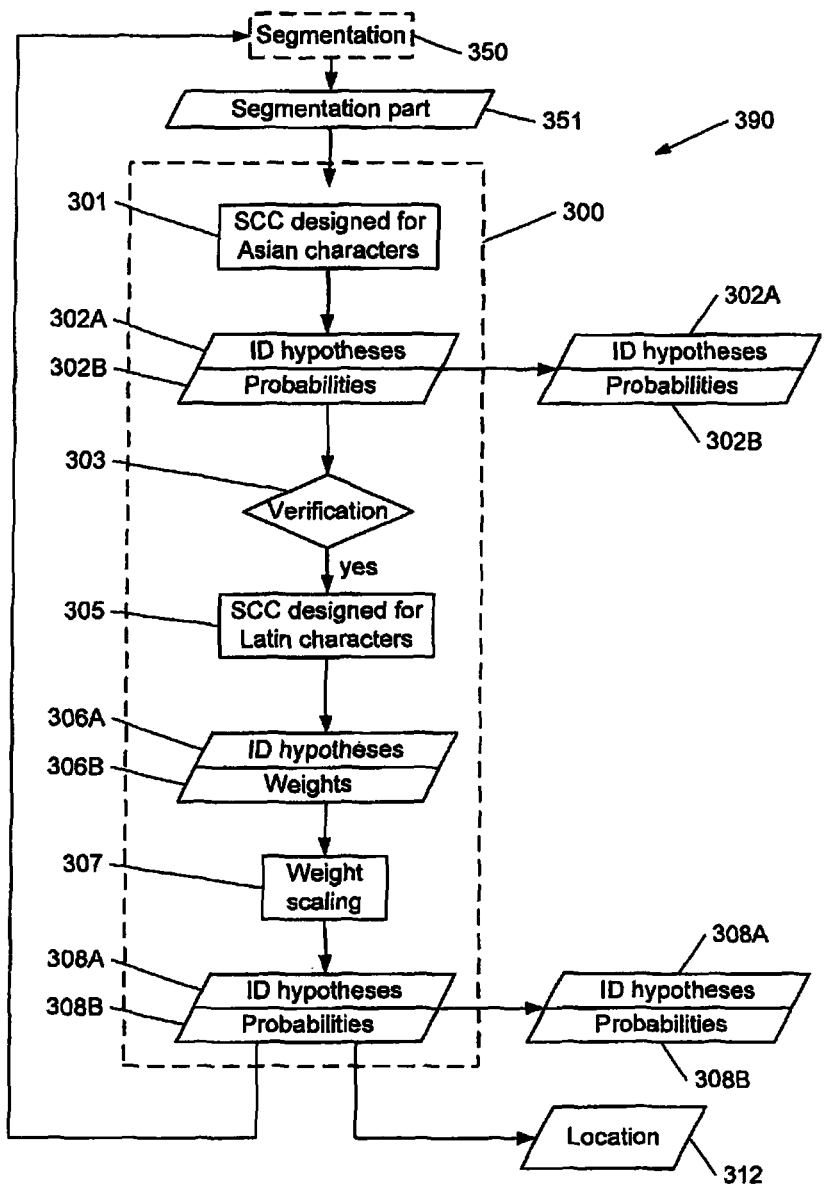
FIG. 3 shows a flowchart of a combination step combining segmentation and single character classification according to an embodiment of the invention.

FIG. 3 shows a flowchart of a step 390 combining segmentation and single character classification according to an embodiment of the invention. A segmentation 350 generates a segmentation part 351. In an embodiment of the present invention, the segmentation 350 is based on the detection of inter-character breaks or word breaks. In a further embodiment of the present invention, the segmentation 350 generates atoms, which are ensemble of pixels of a given color, and a segmentation part comprises one to five atoms. In still an other embodiment of the present invention, the segmentation 350 comprises the steps of:

determining a first starting point coordinate of a pixel contrasting to a background, generating a list of potential character widths dependent on a maximum character width and on characteristics of the portion of the character string image corresponding to the maximum character width, and determining a second portion of the character string image corresponding to the first starting point coordinate and the first width on the list of potential character widths.

The segmentation part 351 is then classified by a single character classification step 300 according to an embodiment of the invention.

In the single character classification 300, the segmentation part 351 is first analyzed by a single character classification 301 designed for Asian characters to generate one or several hypotheses 302A on the ID of the character represented by the segmentation part 351 and associated probabilities 302B. In an embodiment of the invention, the probability is a number in the interval [0,1], where 1 indicates an excellent match between an ID hypothesis and the segmentation part 351 and 0 a very bad match between an ID hypothesis and the segmentation part 351. The one or several hypotheses 302A on the ID of the character and associated probabilities 302B are an output of the combination step 390.

In an embodiment of the invention, the single character classification designed for Asian characters 301 does not include the possibility of recognizing Latin characters, and all hypotheses of 302A relate to Asian characters. In an embodiment of the invention, the single character classification designed for Asian characters 301 includes the possibility of recognizing Latin characters and hypotheses 302A relate to Asian or Latin characters.

In an embodiment of the invention, the single character classification designed for Asian characters 301 includes a feature extraction step that generates a feature vector. The feature extraction step involves a Gabor filter that is a sinusoidal wave multiplied by a Gaussian function. The feature vector is used to generate the probabilities of models of characters of a predetermined list.

A verification step 303 checks if the one or several hypotheses 302A on the ID of the character verifies at least one condition in a list of one or several conditions.

In an embodiment of the present invention, one of the conditions of the list is that all probabilities 302B of the hypotheses 302A are below a given threshold. A high threshold means that the condition in the verification step 303 is easily satisfied and many segmentation parts 351 will be analyzed by the second single character classification 305 designed for Latin characters as will be described later, which increases the accuracy of the overall OCR method but decreases its speed. A low threshold means that the condition in the verification step 303 is not easily satisfied and not many segmentation parts 351 will be analyzed by the single character classification 305, which increases the speed of the method but decreases its accuracy. In an embodiment of the invention, the threshold is at 0.7, which is a trade-off between speed and accuracy.

Figure 4:
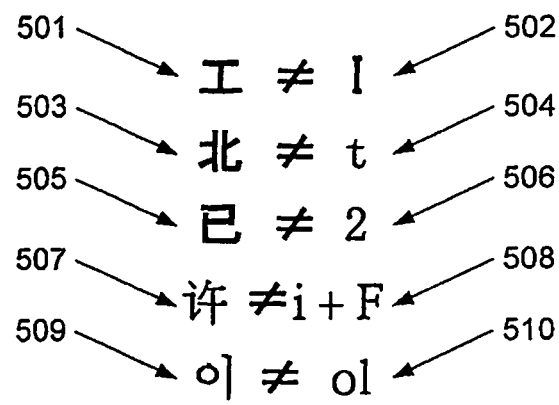
FIG. 4 illustrates the resemblance between some Asian and Latin characters, the resemblance being used in an embodiment of the present invention.

In an embodiment of the present invention, one of the conditions of the list in step 303 is that at least an hypothesis amongst the one or several hypotheses 302A relates to an Asian character known to look like a Latin character. FIG. 4 illustrates the resemblance between some Asian and Latin characters. The Asian character 工 501 (CJK Unified Ideograph 5DE5) looks like the I 502 (Latin capital letter i). The right part of the Asian character 北 503 (CJK Unified Ideograph 5317) can be confound with a t 504. The Asian character 巳 505 (CJK Unified Ideograph 52F2) looks like a 2 (digit two) 506. The Asian character 许 507 (CJK Unified Ideograph 8BB8) can be confound with the letters i and F 508. The Asian character 이 509 (Hangul Syllable i) can be confound with the letters o and l 510 (O and L in lower case). For example, the single character classification 301 designed for Asian characters may provide, for a given segmentation part 351, the Asian character 이 505 as hypothesis with a high probability even if the segmentation part actually represents the character 2. It is interesting for accuracy that such a segmentation part is analyzed by a single character classification designed for Latin characters.

In an embodiment of the present invention, where the single character classification 301 designed for Asian characters includes the possibility of recognizing Latin characters, one of the conditions of the list is that an hypothesis amongst the hypotheses 302A relates to a Latin character.

In an embodiment of the present invention, where the single character classification 301 designed for Asian characters includes the possibility of recognizing Latin characters, one of the conditions of the list is that an hypothesis of probability equal to higher than a threshold amongst the hypotheses 302A relates to a Latin character. In a further embodiment of the invention, the threshold is equal to 50%.

In an embodiment of the present invention, where the single character classification 301 designed for Asian characters includes the possibility of recognizing Latin characters, one of the conditions of the list is that an hypothesis of highest probability amongst the hypotheses 302A relates to a Latin character.

If at least one of the conditions of the list is satisfied at the verification step 303, the single character classification 300 continues with a single character classification 305 designed for Latin characters.

The output of the single character classification 305 designed for Latin characters is one or several hypotheses 306A on a Latin ID of the character on the segmentation part 351, associated with weights 306B. In an embodiment of the present invention, weights 306B are numbers in the interval [0,255], where the number 0 indicates an excellent match between an ID hypothesis and the segmentation part 351 and the number 255 indicates a very bad match between an ID hypothesis and the segmentation part 351.

In an embodiment of the present invention, a weight scaling step 307 is necessary to match the scale of the Latin weights $W_{Latin}$ 306B of the Latin ID hypotheses 306A to the scale of the Asian probabilities 302B of the Asian ID hypotheses 302A. A transformed Latin probability $P_{Latin,transformed}$ 308B is calculated by the formula $$P_{Latin,transformed} = \frac{1}{1 + \exp(0.2 * W_{Latin} - 2.6)}$$

The output of the weight scaling step 307 is the hypotheses 308A on Latin ID of the character on the segmentation part, which are the same as the Latin ID hypotheses 306A, but associated now with transformed Latin probabilities 308B that can be compared directly with the probabilities 302B that the hypotheses 302A on the Asian ID of the character are correct. The one or several hypotheses 308A on Latin ID of the character on the segmentation part with their associated probabilities 308B are an output of the combination step 390.

The location 312 of the segmentation part 351 that underwent the single character classification designed for Latin characters 305 is another output of the combination step 390.

The combination step 390 then uses segmentation 350 to generate a next segmentation part 351.

In an embodiment of the present invention, once the combination step 390 is performed on a full image of the string of character, to generate one or several hypotheses 302A on the Asian ID with their associated probabilities 302B and one or several hypotheses 308A on the Latin ID with their associated probabilities 308B on all segmentation parts, a step of contextual decision is performed in order to determine the combination of hypotheses 302A and 308A that provides the identification of the string of characters.

In an embodiment of the present invention, at least one of the single character classifications 301 and 305, is performed by a single character classifier.

In an embodiment of the present invention, the single-character classifications 301 and 305 are extended to classify groups of characters. In an embodiment of the present invention, the single-character classifications 301 and 305 are extended to classify ligatures.

Even if FIG. 3 describes an embodiment of the invention where the first classification 301 is designed for Asian character recognition and the second classification 305 is designed for Latin character recognition, the invention can be used for other types of characters like Arabic characters, Cyrillic characters, Greek characters, Hebrew characters, hieroglyphs, etc. . . . .

Figure 5:
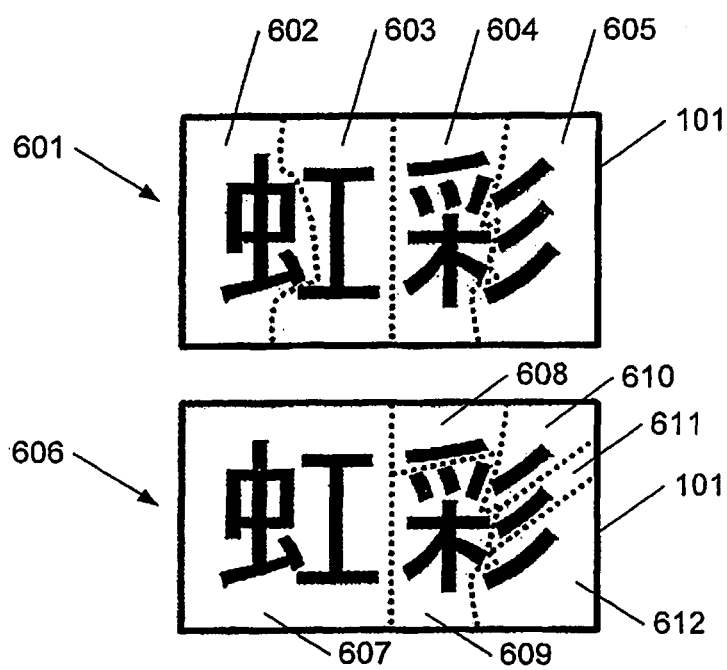
FIG. 5 illustrates a combined segmentation and single-character classification according to an embodiment of the present invention.

FIG. 5 illustrates a combined segmentation and single-character classification according to an embodiment of the present invention.

The segmentation divides first the image of the string of characters 101 into four segmentation parts 602, 603, 604 and 605 to generate a first plurality 601 of segmentation parts. Then, the single character classification analyzes the first segmentation part 602 and generates n602 hypotheses $C_{802-1}$ to $C_{602-n602}$, each hypothesis $C_{602-i}$ having an associated probability $P_{602-1}$. Then, the single character classification analyzes the second segmentation part 603 and generates n603 hypotheses $C_{603-1}$ to $C_{603-n603}$, each hypothesis $C_{603-1}$ having an associated probability $P_{603-i}$. The single character classification is repeated four times, since the first plurality 601 of segmentation parts contains four segmentation parts 602, 603, 604 and 605.

Then, the segmentation divides the image of the string of characters 101 into six segmentation parts 607, 608, 609, 610, 611 and 612 to generate a second plurality 602 of segmentation parts. Then, the single character classification analyzes the first segmentation part 607 and generates n607 hypotheses $C_{607-1}$ to $C_{607-n607}$, each hypothesis $C_{607-i}$ having an associated probability $P_{607-i}$. Then, the single character classification analyzes the second segmentation part 608 and generates n608 hypotheses $C_{608-1}$ to $C_{608-n608}$, each hypothesis $C_{608-1}$ having an associated probability $P_{608-1}$. The single character classification is repeated six times, since the second plurality 606 of segmentation parts contains six segmentation parts 607, 608, 609, 610, 611 and 612.

The segmentation and the series of single character classifications are repeated a number of times to provide hypotheses on the ID of the characters.

In an embodiment of the present invention, the process illustrated in FIG. 5 is used in combination with the flowchart of FIG. 3.

Figure 6:
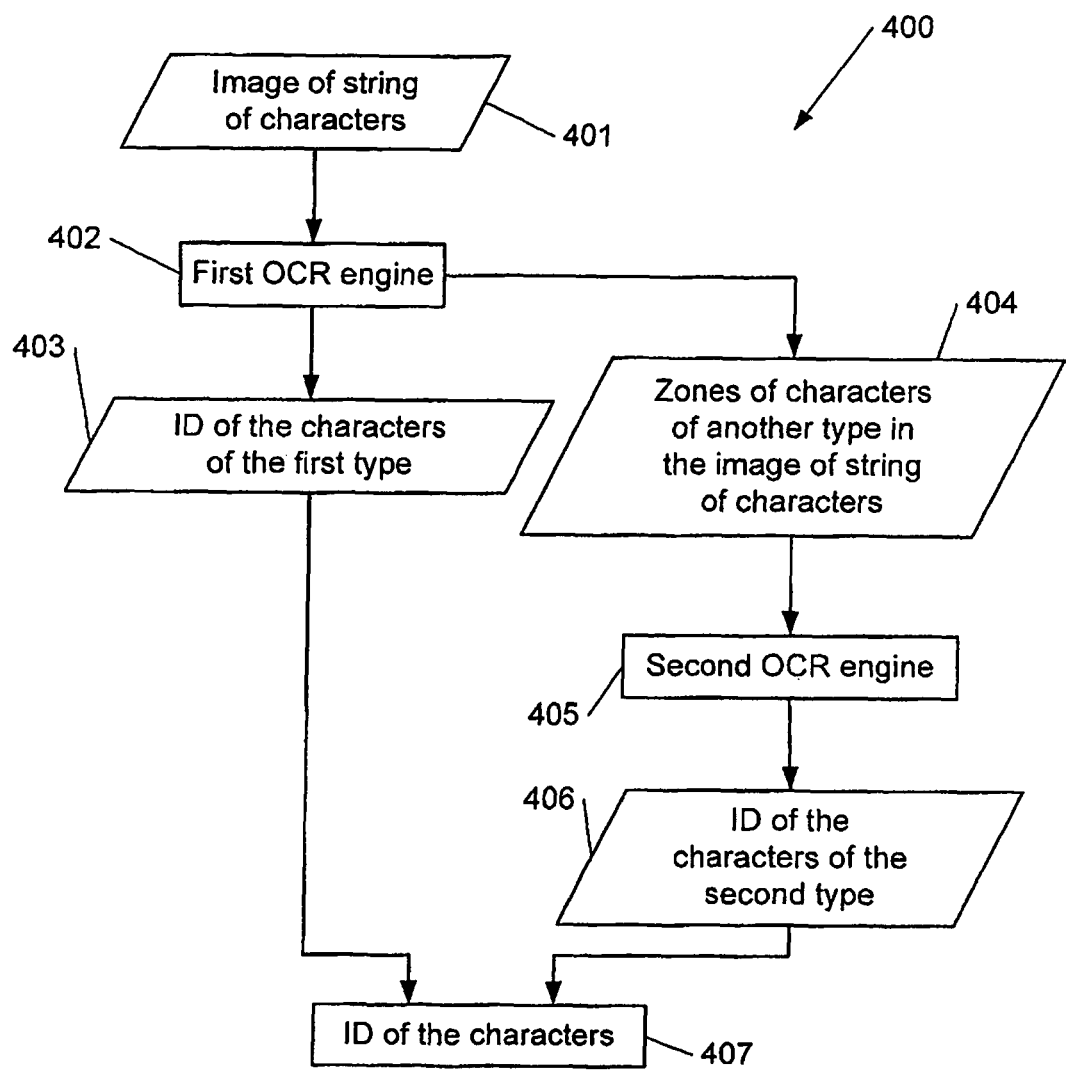
FIG. 6 shows a flowchart of an OCR method according to an embodiment of the invention.

FIG. 6 shows a flowchart of an OCR method 400 according to an embodiment of the invention. An image 401 of a string of characters is taken as input by a first OCR engine 402. In an embodiment of the invention, the image 401 of a string of characters is an horizontal line or part of an horizontal line. In another embodiment of the present invention, the image 401 of a string of characters is a vertical line or part of a vertical line.

The first OCR engine 402 is designed for a first type of characters. In an embodiment of the invention, the first OCR engine 402 is designed for Asian characters. In an embodiment of the invention, the first OCR engine 402 is designed for Asian characters and includes the possibility of recognizing Latin characters. In an embodiment of the invention, the first OCR engine 402 uses a combination step 390 combining segmentation and single character classification using two single character classifiers as illustrated on FIG. 3. In an embodiment of the invention, the first OCR engine 402 uses a single character classification 300 as illustrated on FIG. 3. The first OCR engine 402 generates an ID 403 for characters of the first type and determines zones 404 of characters of another type in the image 401 of string of characters.

In an embodiment of the invention, the zones 404 of characters of another type in the image 401 are zones where the first OCR engine 402 could not identify characters of the first type with a good level of confidence, the level of confidence being judged according to a predefined criterion.

In a further embodiment of the invention, the zones 404 of characters of another type in the image 401 are ensembles of contiguous segmentation parts. In another embodiment of the invention, the zones 404 of characters of another type in the image 401 are ensembles of non-contiguous segmentation parts.

In an embodiment of the invention, the zones 404 of characters of another type in the image 401 contain at least two characters. In an embodiment of the invention, the zones 404 of characters of another type in the image 401 contain at least two contiguous characters because the contextual decision step of the second OCR engine 405 is more accurate when working with at least two characters.

In an embodiment of the invention, a zones 404 of characters of another type in the image 401 is no longer than a line of text. In an embodiment of the invention, a zones 404 of characters of another type in the image 401 is no longer than a column of text.

In an embodiment of the present invention, the selection of zones 404 of characters of another type in the image 401 are as large as possible because the second OCR engine 405 is more accurate when working with large areas including many characters than with small areas including only one or a few characters.

In an embodiment of the invention, the zones 404 of characters of another type in the image 401 are ensembles of segmentation parts, wherein at least one segmentation part satisfies at least one of the following conditions, which are checked by the first OCR engine 402:

a character of the another type of characters than the first type of character was detected on the segmentation part by the first OCR engine 402;

the probability of identification of the segmentation part by the first OCR engine 402 is below a threshold;

the identification of the segmentation part corresponds to a character of the first type of character known to look like a character of another type of character; and a character of the second type of characters was identified on said segmentation part by the first OCR engine.

The zones 404 of another type of characters are then processed by a second OCR engine 405. In an embodiment of the invention, the second OCR engine 405 is designed for a second type of characters. In an embodiment of the invention, the second OCR engine 405 is designed for Latin characters. In an embodiment of the invention, the second OCR engine 405 detects the language of the Latin characters. In an embodiment of the invention, the second OCR engine 405 uses English as default assumption for the language of the Latin characters. In an embodiment of the invention, the second OCR engine 405 uses a predetermined language for the language of the Latin characters. In an embodiment of the invention, the second OCR engine 405 is a multi-language OCR. In an embodiment of the invention, the second OCR engine 405 uses a combination step 390 combining segmentation and single character classification as illustrated on FIG. 3. In an embodiment of the invention, the second OCR engine 405 uses a single character classification 300 as illustrated on FIG. 3. In an embodiment of the invention, the second OCR engine 405 uses only one single character.

The second OCR engine 405 generates an ID 406 for the characters of the second type. The output 407 of the OCR method 400 is a combination of the ID of the characters of the first type 403 and the ID of the characters of the second type 406 in an order corresponding to the position of the characters in the character string image 401.

In an embodiment of the invention, at least one of the first OCR engine 402 and the second OCR engine 405 uses a pre-processing of the image of string of characters 401 to realize an image enhancement. In an embodiment of the invention, at least one of the first OCR engine 402 and the second OCR engine 405 uses a binarization of the image of string of characters 401 to separate the foreground and the background of the image of string of characters 401.

In an embodiment of the present invention, contextual decisions based on decision graphs are used in at least one of the first OCR engine 402 and the second OCR engine 405. The output of the combination step combining segmentation and single character classification of the considered OCR engine, which is a series of hypotheses on the ID of the characters and probabilities associated with these hypotheses, is used to generate a first decision graph. In a decision graph, an arc is created for each hypothesis, associated with its segmentation part and its probability. An arc for a segmentation part starts at a node where ends the segmentation part just before said segmentation part on the image of string of characters 401, and ends at a node where start all the segmentation parts just after said segmentation part on the image of string of characters 401.

Several decision models are then used to improve the identification accuracy. The decision models analyze the hypotheses emitted by the step combining segmentation and single character classification, and allocate to them additional identification probabilities that are added in the decision graph. The ID of the characters of the image of the string of characters taken as output of the considered OCR engine is determined by finding the path in the decision graph that maximizes the identification probability for the full string of characters.

A first kind of decision model is a linguistic model. If the word "ornate" is present in the image of string of character to be identified, a combination step combining segmentation and single character classification can for example finds the word "omate" and the word "ornate" as hypotheses with similar probabilities because the letters rn taken together look like the letter m. A linguistic model using a dictionary is able to detect that the word "omate" does not exist, while the word "ornate" does.

In an embodiment of the present invention, the linguistic model uses an n-gram model. If the word "TRESMEUR" is present in the image of string of character 401, a combination step combining segmentation and single character classification can for example finds the word "TRE5MEUR" and the word "TRESMEUR" as hypotheses with similar probabilities because the letters 'S' may look like the letter '5' in a printed text. A linguistic model using a bigram (n-gram with n=2) model would prefer "TRESMEUR" if "ES" and "SM" have better probabilities of occurrence than "E5" and "5M".

Another kind of model used in an embodiment of the present invention is a typographical model. If the word "Loguivy" is present in the image of string of character 401, a combination step combining segmentation and single character classification can for example finds the word "Loguivy" and the word "Loguivv" as hypotheses with similar probabilities because the letters 'y' may look like the letter 'v' in a printed text. A typographic model using font metrics would prefer "Loguivy" because the position of the bottom of the final character corresponds more likely to the bottom position of a 'y' (in his model) than a 'v'.

In an embodiment of the present invention, the typographical model considers the position of the character in the image to check if sizes and positions are expected or not.

These examples of linguistic and typographical models make clear the reason why it is advantageous that the zones 404 of characters of another type in the image 401 are as large as possible and contain at least two contiguous characters, since contextual models are more accurate when working on more characters.

In an embodiment of the present invention, an OCR engine designed for Asian character considers a line of characters as the image of string of character for its input and a decision graph is generated for each line of characters. In an embodiment of the present invention, an OCR engine designed for Latin character considers a word as the image of string of character for its input and a decision graph is generated for each word.

In an embodiment of the present invention, the second OCR engine determines zones of a third type of characters in the image 401 of string of character and a third OCR engine, designed for the third type of characters, processes the zones of the third type of characters. In a further embodiment of the invention, more types of characters are considered in a similar way, with OCR engines designed for different types of character working one after each other in cascade or in parallel with each other, and based on the fulfillment of given conditions, the overall OCR method will use more or less OCR engines to identify characters.

An OCR method according to an embodiment of the present invention can be described as follows. The image of a line of characters, which are expected to be mainly Asian characters, is analyzed by a first OCR engine. The segmentation of the first OCR engine is a segmentation designed for Asian character. It divides the image of a line of characters into atoms and then generates segmentation parts that include between one and five atoms. A segmentation part is first analyzed by a single character classification designed for Asian characters but able to classify Latin characters, to generate one or several Asian hypotheses on said segmentation part, with their associated probabilities. The probabilities are number in the interval [0,1].

The one or several Asian hypotheses are verified according to three conditions. If none of the conditions is satisfied, the one or several Asian hypotheses, with their associated probabilities, are taken as the single output of the single character classification, the conditions being:

All the probabilities associated to the Asian hypotheses are below 0,7.
One of the Asian hypotheses is actually a Latin character with a probability of at least 0,5.
One of the Asian hypotheses is an Asian character that is known to look like a Latin character.

If at least one of these conditions is satisfied, the segmentation part is then analyzed by a single character classification designed for Latin characters, to generate one or several Latin hypotheses on said segmentation part, with their associated weights. The weights, which are numbers in the interval [0,255] are transformed according to the formula $$P_{Latin, transformed} = \frac{1}{1 + \exp(0.2 * W_{Latin} - 2.6)}$$

to generate probabilities that can be directly compared with the probabilities of Asian hypotheses.

The outputs of the single character classification are then
(1) one or several Asian hypotheses, with their associated probabilities;
(2) one or several Latin hypotheses, with their associated probabilities; and
(3) the locations of the one or several Latin hypotheses.

Then, the process is repeated on a next segmentation part.

Once all the segmentations parts of the image of the string of characters have been through the Asian single character classifier, and possibly through the Latin single character classifier, all the Asian hypotheses and their probabilities, and the Latin hypotheses and their probabilities are used to generate a first decision graph. Contextual decision designed for Asian characters, but able to manage Latin characters, is then applied to generate a second decision graph. The path along the second decision graph that maximizes the probability of identification of the full string of characters is taken as output of the first OCR engine. This path contains Asian characters and may contain also Latin characters.

If this path contains Latin characters, i.e., if Latin characters are identified by the first OCR engine, the locations of zones of these Latin characters are transmitted to a second OCR engine, which is designed for Latin characters. Indeed, since these zones contain Latin characters, it is interesting, to improve accuracy, to apply there a full OCR engine designed for Latin characters, including contextual decision designed for Latin characters, which was not done so far. A zone is defined as the largest area of the image of the line of characters that contain only Latin characters. A zone contains at least two characters. It is preferable that these zones are as large as possible because the more characters are analyzed at once by the contextual decision methods, the more accurate these methods are. The second OCR engine identifies then the Latin characters on these zones.

The Asian characters identified by the first OCR engine and the Latin characters identified by the second OCR engine are then ordered according to their location on the image of the string of characters, to be the identification of the characters of the image of the string of characters.

The invention claimed is:

1. A method for identifying characters in a character string image, the method comprising:
    (i) applying a first Optical Character Recognition engine to provide an identification of characters of at least a first type of characters and zones of at least a second type of characters in the character string image,
    (ii) applying on the zones of the at least second type of characters a second Optical Character Recognition engine to provide an identification of characters of a second type of characters, and
    (iii) combining the characters identified by the first Optical Character Recognition engine and by the second Optical Character Recognition engine to obtain the identification of the characters of the character string image,
    wherein the first Optical Character Recognition engine comprises a segmentation of the character string image into segmentation parts, the segmentation of the character string image into segmentation parts comprising the steps of
        determining a first starting point coordinate of a pixel contrasting to a background,
        generating a list of potential character widths dependent on a maximum character width and on characteristics of the portion of the character string image corresponding to the maximum character width, and
        determining a second portion of the character string image corresponding to the first starting point coordinate and the first width on the list of potential character widths, and wherein the first Optical Character Recognition engine comprises, for each segmentation part, the steps of:
    (a) applying a first character classification to provide a first plurality of hypotheses on an at least one character represented by the segmentation part and a first plurality of probabilities associated with the first plurality of hypotheses,
    (b) verifying if the first plurality of hypotheses satisfies at least one condition,
    (c) if at least one condition is satisfied, applying a second character classification to provide a second plurality of hypotheses on the at least one character represented by the segmentation part and a second plurality of probabilities associated with the second plurality of hypotheses.

2. A method according to claim 1, wherein the first Optical Character Recognition engine uses a database of characters including characters of the first type of characters.

3. A method according to claim 2, wherein the first character classification uses a database of characters including characters of the first type of characters.

4. A method according to claim 3, wherein the first character classification is able to detect characters of at least another type of characters than the first type of characters.

5. A method according to claim 4, wherein the first type of characters is an Asian type of characters.

6. A method according to claim 4, wherein the second Optical Character Recognition engine uses a database of characters including characters of the second type of characters.

7. A method according to claim 6, wherein the second character classification uses a database of characters including characters of the second type of characters.

8. A method according to claim 7, wherein the second type of characters is a Latin type of characters.

9. A method according to claim 7, wherein the second type of characters is the Asian type of characters, the Arabic type of characters, the Hebrew type of characters, the Cyrillic type of characters, the Greek type of character or the hieroglyph type of characters.

10. A method according to claim 4, wherein the at least one condition is one of the following conditions
    all probabilities of the first plurality of hypotheses are below a given threshold;
    a hypothesis amongst the first plurality of hypotheses relates to a character of the first type of characters known to look like a character of the at least second type of characters; and
    a hypothesis with a probability higher than a given threshold amongst the first plurality of hypotheses relates to another type of characters than the first type of characters.

11. A method according to claim 3, wherein the first type of characters is the Latin type of characters, the Arabic type of characters, the Hebrew type of characters, the Cyrillic type of characters, the Greek type of character or the hieroglyph type of characters.

12. A method according to claim 1, wherein at least one of the first character classification and second character classification is a single character classification.

13. A method according to claim 1, wherein the zones of the at least second type of characters are groups of segmentation parts, and wherein at least one segmentation part of the groups of segmentation parts satisfies at least one of the following conditions:
    all probabilities of the first plurality of hypotheses provided by the first character classification for the at least one segmentation part are below a given threshold;
    a hypothesis amongst the first plurality of hypotheses for the at least one segmentation part relates to a character of the first type of characters known to look like a character of the at least second type of characters;
    a hypothesis amongst the first plurality of hypotheses for the at least one segmentation part relates to another type of characters than the first type of characters; and
    a character of the second type of characters was identified on the at least one segmentation part by the first Optical Character Recognition engine.

14. A method according to claim 1, wherein a zone of the at least second type of characters is a group of segmentation parts that includes at least two characters.

15. A method according to claim 1, wherein
    the first plurality of probabilities corresponds to a first scale of probability,
    the second plurality of probabilities corresponds to a second scale of probability, and
    the method comprises a step of transforming at least one of the first plurality of probabilities and second plurality of probabilities to scale the first or the second scales of probability in such a way that the first plurality of probabilities and the second plurality of probabilities can be compared, to obtain transformed first or second pluralities of probabilities.

16. A method according to claim 1, wherein the first Optical Character Recognition engine further comprises a step of making a contextual decision for the identification of characters of the at least first type of characters based on the first plurality of hypotheses from the first character classification and the first plurality of probabilities associated with the first plurality of hypotheses, and the second plurality of hypotheses from the second character classification and the second plurality of probabilities associated with the second plurality of hypotheses for all segmentation parts.

17. A method according to claim 16, wherein the step of making a contextual decision uses at least one of the decision support tools among decision graph, linguistic model, typographical model, and decision model based on n-gram model.

18. A computer program product embodied on a non-transitory computer usable storage medium for causing a computing device to identify characters in a character string image, comprising:
   (i) first computer code for applying a first Optical Character Recognition engine to provide an identification of characters of at least a first type of characters and zones of at least a second type of characters in the character string image,
   (ii) second computer code for applying on the zones of at least a second type of characters a second Optical Character Recognition engine to provide an identification of characters of a second type of characters, and
   (iii) third computer code for combining the characters identified by the first Optical Character Recognition engine and by the second Optical Character Recognition engine to obtain the identification of the characters of the character string image,
   wherein the first Optical Character Recognition engine comprises a segmentation of the character string image into segmentation parts, the segmentation of the character string image into segmentation parts comprising the steps of:
      determining a first starting point coordinate of a pixel contrasting to a background,
      generating a list of potential character widths dependent on a maximum character width and on characteristics of the portion of the character string image corresponding to the maximum character width, and
      determining a second portion of the character string image corresponding to the first starting point coordinate and the first width on the list of potential character widths,
   and wherein the first Optical Character Recognition engine comprises, for each segmentation part, the steps of:
      (a) applying a first character classification to provide a first plurality of hypotheses on an at least one character represented by the segmentation part and a first plurality of probabilities associated with the first plurality of hypotheses,
      (b) verifying if the first plurality of hypotheses satisfies at least one condition, and
      (c) if at least one condition is satisfied, applying a second character classification to provide a second plurality of hypotheses on the at least one character represented by the segmentation part and a second plurality of probabilities associated with the second plurality of hypotheses.

19. A method for identifying characters in a character string image, the method comprising the steps of:
   (A) segmenting of the character string image into segmentation parts, the segmentation of the character string image into segmentation parts comprising the steps of:
      determining a first starting point coordinate of a pixel contrasting to a background,
      generating a list of potential character widths dependent on a maximum character width and on characteristics of the portion of the character string image corresponding to the maximum character width, and
      determining a second portion of the character string image corresponding to the first starting point coordinate and the first width on the list of potential character widths,
   (B) for each segmentation part, the substeps of:
      (a) applying a first character classification to provide a first plurality of hypotheses on an at least one character represented by the segmentation part and a first plurality of probabilities associated with the first plurality of hypotheses,
      (b) verifying if the first plurality of hypotheses satisfies at least one condition,
      (c) if at least one condition is satisfied, applying a second character classification to provide a second plurality of hypotheses on the at least one character represented by the segmentation part and a second plurality of probabilities associated with the second plurality of hypotheses, and
   (C) making a contextual decision for the identification of the characters of the at least first type of characters based on the first plurality of hypotheses from the first character classification and the first plurality of probabilities associated with the first plurality of hypotheses, and the second plurality of hypotheses from the second character classification and the second plurality of probabilities associated with the second plurality of hypotheses for all segmentation parts.

20. A computer program product embodied on a non-transitory computer usable storage medium for causing a computing device to identify characters in a character string image, comprising:
   (A) first computer code for segmenting of the character string image into segmentation parts, the segmentation of the character string image into segmentation parts comprising the steps of:
      determining a first starting point coordinate of a pixel contrasting to a background,
      generating a list of potential character widths dependent on a maximum character width and on characteristics of the portion of the character string image corresponding to the maximum character width, and
      determining a second portion of the character string image corresponding to the first starting point coordinate and the first width on the list of potential character widths,
   (B) second computer code for applying, for each segmentation part, the substeps of:
      (a) a first character classification to provide a first plurality of hypotheses on an at least one character represented by the segmentation part and a first plurality of probabilities associated with the first plurality of hypotheses,
      (b) a verification if the first plurality of hypotheses satisfies at least one condition,
      (c) if at least one condition is satisfied, a second character classification to provide a second plurality of hypotheses on the at least one character represented by the segmentation part and a second plurality of probabilities associated with the second plurality of hypotheses, and (C) third computer code for making a contextual decision for the identification of the characters of the at least first type of characters based on the first plurality of hypotheses from the first character classification and the first plurality of probabilities associated with the first plurality of hypotheses, and the second plurality of hypotheses from the second character classification and the second plurality of probabilities associated with the second plurality of hypotheses for all segmentation parts.

* * * * *